Sept. 18, 1923.  
J. C. MacLACHLAN  
SPRAYING AND BEATING HEAD  
Filed Oct. 4, 1919

Inventor  
John C. MacLachlan  
By his Attorneys  
Williamson & Merchant

Patented Sept. 18, 1923.

1,468,118

UNITED STATES PATENT OFFICE.

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

SPRAYING AND BEATING HEAD.

Application filed October 4, 1919. Serial No. 328,495.

*To all whom it may concern:*

Be it known that I, JOHN C. MacLACHLAN, a citizen of the United States, residing at St. Paul, in the county of Ramsey and State of Minnesota, have invented certain new and useful Improvements in Spraying and Beating Heads; and I do hereby declare the following to be a full, clear, and exact description of the invention, such as will enable others skilled in the art to which it appertains to make and use the same.

My present invention has for its object to provide an improved spraying and beating device for reducing to finely divided dry form, such substances as milk, butter milk, and various food substances which have first been reduced to a heavy liquid condition, or certain other substances which have been reduced to a heavy pasty form, which may be designated as a semi-liquid condition. In producing a milk substance in a dry powdered or granular form, for example, the milk should be first reduced to the consistency of the heavy condensed milk. However, the degree of fineness to which the food substance will be reduced by this device will be dependent largely upon the extent to which the substance has first been condensed.

This invention is directed particularly to the provision of a device which will beat and spray the heavy fluid substance and which will permit the use of a stationary or non-rotary discharge head for the delivery of such substance to the beater that is arranged to rotate above the same.

The preferred form of this improved device is illustrated in the accompanying drawings wherein like characters indicate like parts throughout the several views.

Referring to the drawings:

Fig. 1 is a view in vertical section taken axially through the combined spraying and beating head and showing also means for the delivery of the substance to the discharge head;

Fig. 2 is a horizontal section chiefly on the line 2—2 of Fig. 1, but with some parts broken away and some parts sectioned on the line *x—x* of Fig. 1; and Fig. 3 is a fragmentary view showing in side elevation a portion of the combined spraying and beating device.

The beater is carried at the lower end of an upright shaft or spindle 4, which, as shown, is journaled in suitable bearings 5 on a supporting spindle 6, which, in turn is rigidly secured to an overhead removable bearing plate 7 that constitutes a part of the top 8 of a large hot air chamber, not fully shown, but within the upper portion of which the beater is arranged to rotate. The beater, as shown, and as preferably designed, comprises an approximately disk-like bottom plate 9 that is rigidly secured to the lower end of the spindle 4. Rigidly secured at the rim portion of the bottom plate 9 by means of circumferentially spaced nut-equipped tie bolts 10, is an annular top plate 11; and rigidly secured between and to the rim portions of the two plates 9 and 11 are beater blades 12 that are preferably slightly curved and forwardly inclined in respect to the direction of rotation of the head. Moreover, the rim portion of the plates 9 and 11 is preferably downwardly inclined in an outward direction so that they tend to throw outward and downward an umbrella-like shower of finely beaten material into the hot drying chamber. Between the blades 12 the rim of lower plate 9 is cut away to permit downward passage of the beaten material.

Here it should be noted that the bearings 5 are, as shown, of the ball bearing type, and that the upper plates of each bearing are secured to the spindle 4, so as to hold the latter against downward movement while free to rotate. The spindle 4 will be rotated at high velocity but in such manner, as for example by power driven belt, not shown, but which would run over a pulley 13 on the upper portion of said spindle.

The discharge head 14 for the heavy or semi-fluid material, which, as already stated, is of annular form, loosely surrounds the lower portion of the spindle 4 and is rigidly secured to a tubular hanger 15, the flanged upper end of which, as shown, is bolted directly to the bearing plate 7. The outer wall of the head 14 is preferably made bell-shaped in vertical section, and at its lower portion is shown as provided with a plurality of radially extended circumferentially spaced discharge orifices 16, the outer extremities of which are quite close to the inner extremities of the beating blades 12, but are located far above the underlying portion of the bottom plate 9 of the beater head.

The condensed milk or other heavy liquid to be treated may be supplied from any suitable source, as for example, from an overhead vat 17 provided with a depending discharge pipe 18 that opens into the upper portion of the discharge head 14.

The operation of the above device is substantially as follows:

The substance to be treated and which we may assume to be condensed milk, will be delivered by gravity or pressure, or the combined action of both, from the vat or source of supply, into the hollow discharge head 14, and from the latter, will be projected in the form of a multiplicity of streams, through the discharge orifices 16, and in passing from said orifices, will be projected outwardly and downwardly into the space between the beating blades 12. Hence, the beating blades will violently strike these projected streams of condensed milk, and by combined beating action and the action of centrifugal force, will disintegrate the heavy fluid substance and project the same violently outward into the hot drying air in the form of an umbrella-like shower; and the substance thus beaten and projected, in its precipitation through the hot air, will be thoroughly dried so that it will reach the bottom of the drying chamber in the form of a finely divided dry substance. This finely divided dry substance will not be a very fine powder, but on the contrary, when the extent of preliminary condensation is properly carried out, the beating device will reduce such substance to a granular form capable of being very easily dissolved even in cold water. The beating action should be produced by very high velocity of the rotary beater, and in practice it is customary to rotate the same at approximately 5000 revolutions per minute. In the use of a non-rotary discharge head in connection with the beater rotatable around the same, aside from mechanical advantages in the employment of a non-rotary discharge head, there is an advantage due to the fact that the heavy liquid discharged therefrom will not be given rotary motion with the beater, and hence, will be struck by the beater blades with much greater violence than where the discharge head is arranged to rotate with the beater blades.

What I claim is:

1. A sprayer head for a drying apparatus for fluids having in combination a fixed discharge head having means arranged to project the fluid freely outwardly and a revolving head surrounding said fixed head and provided with circumferentially arranged spaced blades disposed about said means to intercept and beat said freely projected fluid.

2. A sprayer head for a drying apparatus for fluids having in combination a fixed discharge head having means arranged to project the fluid freely outwardly and a revolving head surrounding said fixed head having top and bottom plates spaced above and below said means, and spaced circumferentially arranged blades extending between said plates and surrounding and spaced from said means, whereby the freely projected fluid is intercepted and beaten by said blades.

3. A sprayer head for a drying apparatus for fluids having in combination a fixed discharge head comprising a closed vessel having spaced holes there-around through which the fluid is projected freely outwardly, and a revolving head surrounding said fixed head and provided with circumferentially arranged blades disposed about said holes to intercept and beat the freely projected fluid.

4. A device of the class described having in combination a fixed discharge head having means to project the material outwardly and a beater member surrounding the same comprising an upright rotary spindle, a disk-like plate secured to said spindle below said discharge head, a second plate spaced above and secured to said first mentioned plate and a plurality of beater blades disposed between said plates and spaced from and surrounding said means, said beater blades being curved forwardly in the direction of rotation in horizontal section, said beater member arranged to rotate about said discharge head and to intercept and violently beat the projected material.

5. A device of the class described having in combination a fixed discharge head and a beater member comprising an upright rotary spindle, a disk-like plate secured to said spindle below the discharge head, a plate spaced above and secured to said first mentioned plate and a plurality of beater blades carried between said plates projecting in a general radial direction, said blades being curved forwardly in the direction of rotation in horizontal section and being curved downwardly and rearwardly from the upper to the lower plate in vertical section and adapted to rotate about said discharge head.

6. A sprayer device for a drying apparatus for fluids having in combination a fixed discharge head comprising a general frusto-conical closed vessel having its periphery curved outwardly and downwardly and being provided with a series of holes about its lower portion through which the fluid is projected radially outwardly, and a revolving head surrounding said fixed head and provided with circumferentially arranged spaced blades disposed about and spaced from said holes whereby the projected fluid will be intercepted and violently beaten by said blades.

7. A distributing head for a drying apparatus for fluids having in combination means to project said fluid outwardly in a plurality of radially directed jets, and rotating means extending across the line of projection of said jets adapted to intercept and beat said fluid.

In testimony whereof I affix my signature in presence of two witnesses.

JOHN C. MACLACHLAN.

Witnesses:
CLARE DEMAREST,
BERNICE G. BAUMANN.